（12） United States Patent
Peng et al.

(10) Patent No.: US 10,370,522 B2
(45) Date of Patent: Aug. 6, 2019

(54) POLYPHENYLENE SULFIDE RESIN COMPOSITION, AND MOULDING AND MANUFACTURING PROCESS FOR MOULDING THEREOF

(71) Applicant: TORAY INDUSTRIES, INC., Tokyo (JP)

(72) Inventors: Kai Peng, Shanghai (CN); Xianwen Tang, Shanghai (CN); Qiang Liu, Sichuan (CN); Fen Ouyang, Shanghai (CN); Shunji Kono, Nagoya (JP); Masashi Matsuda, Shenzhen (CN); Ping Hu, Shenzhen (CN); Ying Wai Julian Chan, Harbour (CN)

(73) Assignee: TORAY INDUSTRIES, INC., Tokyo (JP)

( * ) Notice: Subject to any disclaimer, the term of this patent is extended or adjusted under 35 U.S.C. 154(b) by 110 days.

(21) Appl. No.: 14/912,859

(22) PCT Filed: Aug. 5, 2014

(86) PCT No.: PCT/CN2014/083723
§ 371 (c)(1),
(2) Date: Feb. 18, 2016

(87) PCT Pub. No.: WO2015/024439
PCT Pub. Date: Feb. 26, 2015

(65) Prior Publication Data
US 2016/0208081 A1 Jul. 21, 2016

(30) Foreign Application Priority Data

Aug. 22, 2013 (CN) ............................ 2013 1 0371312
Apr. 17, 2014 (CN) ............................ 2014 1 0155164

(51) Int. Cl.
C08K 7/14 (2006.01)
C08G 75/02 (2016.01)
(Continued)

(52) U.S. Cl.
CPC .......... *C08K 7/14* (2013.01); *B29C 45/14008* (2013.01); *C08G 75/02* (2013.01);
(Continued)

(58) Field of Classification Search
CPC . C08K 7/14; C08L 81/04; C08L 81/02; B29C 45/14008; C08G 75/02; B29K 2081/04
See application file for complete search history.

(56) References Cited

U.S. PATENT DOCUMENTS

2007/0021549 A1* 1/2007 Kojima ................. C08K 7/14
524/540
2009/0142566 A1* 6/2009 Machida ................ C08J 5/18
428/220
2013/0069001 A1 3/2013 Luo et al.

FOREIGN PATENT DOCUMENTS

CN 101553537 A 10/2009
CN 101935397 A 1/2011
(Continued)

OTHER PUBLICATIONS

Machine Translation of CN 101935397, 2011.*
(Continued)

*Primary Examiner* — Brian Handville
(74) *Attorney, Agent, or Firm* — Birch, Stewart, Kolasch & Birch, LLP

(57) ABSTRACT

The invention provides a polyphenylene sulfide resin composition which comprises polyphenylene sulfide resin and a deformed cross-section glass fiber, wherein the chlorine content of the polyphenylene sulfide resin composition is equal to or lower than 1,000 ppm. The obtained polyphe-
(Continued)

nylene sulfide resin composition is excellent in flowability, toughness and rigidity. The invention further provides a molding prepared from the polyphenylene sulfide resin composition and a manufacturing process for the polyphenylene sulfide resin composition. The polyphenylene sulfide resin composition is particularly suitable for products for forming frames of a portable computer, a mobile phone and a portable electronic device.

18 Claims, 1 Drawing Sheet

(51) Int. Cl.
*C08L 81/02* (2006.01)
*B29C 45/14* (2006.01)
*C08L 81/04* (2006.01)
*B29K 81/00* (2006.01)

(52) U.S. Cl.
CPC ............... *C08L 81/02* (2013.01); *C08L 81/04* (2013.01); *B29K 2081/04* (2013.01)

(56) References Cited

FOREIGN PATENT DOCUMENTS

| | | |
|---|---|---|
| CN | 102134319 A | 7/2011 |
| CN | 102329426 A | 1/2012 |
| JP | 2009-203472 A | 9/2009 |
| JP | 2010-260963 A | 11/2010 |
| TW | 200940648 A | 10/2009 |
| WO | WO 2009/096400 A1 | 8/2009 |

OTHER PUBLICATIONS

Machine Translation of CN 101553537, 2009.*
International Search Report, issued in PCT/CN2014/083723 PCT/ISA/210, dated Nov. 18, 2014.
Written Opinion of the International Searching Authority, issued in PCT/CN2014/083723 PCT/ISA/237, dated Nov. 18, 2014.

* cited by examiner

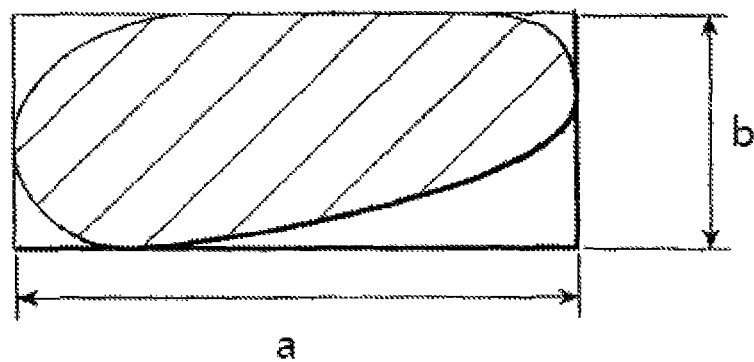

POLYPHENYLENE SULFIDE RESIN COMPOSITION, AND MOULDING AND MANUFACTURING PROCESS FOR MOULDING THEREOF

TECHNICAL FIELD OF THE INVENTION

The invention relates to the field of polymer materials, and in particular to a polyphenylene sulfide resin composition, and a moulding and a manufacturing process for the moulding thereof.

BACKGROUND OF THE INVENTION

Polyphenylene sulfide resin has the characteristics of excellent flowability, high-temperature resistance, corrosion resistance and flame retardancy, balanced physical mechanical performance, extremely high size stability, good electric performance and the like, and is widely used in the fields such as electrics, electronic parts or automobile parts.

A polyphenylene sulfide molecular main chain consists of a large number of benzene ring repeating units. Compared with other engineering plastic, the polyphenylene sulfide resin is high in rigidity and low in toughness as polyphenylene sulfide is easily crystallized thermoplastic resin.

In the Patent Document 1 (of which the publication patent number is CN 101553537 B), a glass fiber with a flat section is added into the polyphenylene sulfide resin, thus further improving its rigidity and flowability. However, the polyphenylene sulfide resin is easy to crystallize; generally, after an inorganic filler such as the glass fiber is added, the toughness of the composition of the polyphenylene sulfide resin is not satisfactory, and the deformation resistance performance of a polyphenylene sulfide resin product is low; when deformed under outer force, the product is easy to break. The Patent Document 2 (of which the publication patent number is CN 1314762 C) discloses a feature that a blend of hydrogenized Styrene Butadiene Styrene (SBS) or Ethylene-Propylene-Diene Monomer (EPDM-g-St) and ethylene-methacrylic acid glycidyl ester is added to improve the toughness of the glass fiber-enhanced polyphenylene sulfide resin; although the toughness of the polyphenylene sulfide resin composition is improved, its rigidity is lowered. The Patent Document 3 (of which the publication patent number is CN 101130633 A) discloses that PA6 is adopted to enhance the toughness of the glass fiber-enhanced polyphenylene sulfide resin; by the use of 10 percent of PA6, the toughness improving effect is the best, and the notched impact strength can be up to 13 kJ/m$^2$, and however, its rigidity is lowered.

In addition, on the one hand, wall thinning of a product is a tendency of development of the existing electronic industry, and a material is expected to be high in flowability. On the other hand, in view of the opinion of reducing the influence on the environment, the requirement on reduction of the halogen content of the material is higher and higher. The polyphenylene sulfide resin is obtained by performing polymerization reaction on p-dichlorobenzene and alkali metal sulfide or alkali metal sulfohydrate, so chlorine residues will be retained on the molecular end of a polymer thereof. The chlorine content of the polymer is generally decided by the molecular weight of the polymer, and the molecular weight is related to the viscosity of the polymer. That is, if the flowability is high and the viscosity is low, the molecular weight is low, the total number of molecular ends is large, and the chlorine content is high. In addition, a reduction of the molecular weight is unfavorable for the mechanical performance of the polymer. At present, the polyphenylene sulfide resin is generally combined with the inorganic filler, thus forming the resin composition; the chlorine content of the resin composition is reduced to an extent; however, in view that the resin composition must have the flowability and the mechanical strength, there are not too much inorganic fillers being added, so a low chlorine content level required in the market cannot be achieved only by adding finite inorganic fillers for combination. Therefore, the conventional art cannot provide a polyphenylene sulfide resin composition which is high in flowability, lower in chlorine content and high in both rigidity and toughness.

As an example of a polyphenylene sulfide resin moulding, the Patent Document 1 (of which the publication patent number is CN 101553537 B) discloses a polyphenylene sulfide resin moulding for an optical element, and the thinnest part of the moulding is 0.3 to 1.4 mm in thickness. The Patent Document 4 (of which the publication patent number is CN 101679745 B) discloses a moulding prepared from the polyphenylene sulfide resin composition for a voltage resistance part. The Patent Document 5 (of which the publication patent number is ON 1644366 A) discloses an embedded type moulding obtained by embedding the polyphenylene sulfide resin composition into a metal or inorganic solid, which is used in the fields of automobile components, electrical, electronic and OA machine components and the like. However, the temperatures of moulds of the above mouldings are higher than 130° C. Under high mould temperature, high crystallization degree of the moulding is easily caused, and the toughness of the moulding is insufficient.

SUMMARY OF THE INVENTION

The invention provides a polyphenylene sulfide resin composition, which is excellent in flowability, low in chlorine content and high in toughness and rigidity, in order to solve the problems in the conventional art.

The goal of the invention can be achieved by the following measures:

A polyphenylene sulfide resin composition, including: polyphenylene sulfide resin (A), and a deformed cross-section glass fiber (B), wherein the chlorine content of the polyphenylene sulfide resin composition is equal to or lower than 1,000 ppm.

The lower limit of the chlorine content of the polyphenylene sulfide resin composition is not specifically defined, which can be equal to or higher than 10 ppm, preferably equal to or higher than 100 ppm, more preferably equal to or higher than 300 ppm.

The polyphenylene sulfide resin belongs to thermoplastic resin with high rigidity and low toughness. A research shows that the toughness can be enhanced by reducing the recrystallization temperature; when the recrystallization temperature of the polyphenylene sulfide resin composition is lower than 220° C., higher toughness can be achieved. The recrystallization temperature of the preferable polyphenylene sulfide resin composition is lower than 220° C.

In view of achieving higher toughness, further preferably, the recrystallization temperature of the polyphenylene sulfide resin composition is lower than 215° C.

In view of achieving higher rigidity, the recrystallization temperature of the polyphenylene sulfide resin composition is preferably equal to or higher than 150° C., and even further preferably equal to or higher than 180° C.

The polyphenylene sulfide resin composition of the invention preferably includes 50 to 200 weight parts of the deformed cross-section glass fiber (B) relative to 100 weight parts of the polyphenylene sulfide resin (A) in order to take the toughness and the rigidity into account. In view of the two aspects of the rigidity and the flowability, the polyphenylene sulfide resin composition further preferably includes 60 to 180 weight parts of the deformed cross-section glass fiber (B) and even further preferably includes 80 to 150 weight parts of the deformed cross-section glass fiber (B) relative to 100 weight parts of the polyphenylene sulfide resin (A).

In view of even further improving the toughness, the polyphenylene sulfide resin composition further includes: amorphous resin (C) with the glass-transition temperature being equal to or higher than 100° C.

In view of the two aspects of the toughness and the flowability, there are preferably 1.5 to 35 weight parts of the amorphous resin (C) with the glass-transition temperature being equal to or higher than 100° C. relative to 100 weight parts of the polyphenylene sulfide resin (A). In order to improve the toughness to a larger extent and guarantee the flowability, there are further preferably 2 to 25 weight parts, even further preferably 4 to 15 weight parts of the amorphous resin (C) with the glass-transition temperature being equal to or higher than 100° C. relative to 100 weight parts of the polyphenylene sulfide resin (A).

The upper limit of the glass-transition temperature of the amorphous resin is not specifically defined, which can be equal to or lower than 400° C., preferably equal to or lower than 300° C.

Polyphenylene Sulfide Resin (A):

The polyphenylene sulfide resin (A) used in the invention can be either a polyphenylene sulfide polymer or a mixture of multiple polyphenylene sulfide polymers. In view of obtaining the polyphenylene sulfide resin composition with excellent flowability, toughness and rigidity, the mixture of multiple polyphenylene sulfide polymers is preferably adopted.

The polyphenylene sulfide polymer is a polymer with a repeating unit represented by the following structural formula (I),

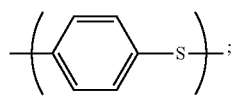

From the viewpoint of heat resistance, the repeating unit represented by the formula (I) accounts for 70 mole percent or over of the polyphenylene sulfide polymer, preferably 90 mole percent or over. In the polyphenylene sulfide polymer, the repeating units are selected from one or more of repeating units (II), (III), (IV), (V), (VI), (VII) and (VIII) with the following structures except for the repeating unit represented by the formula (I),

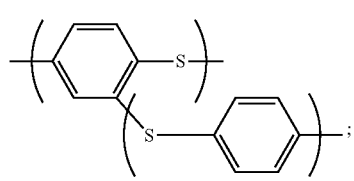

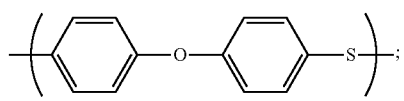

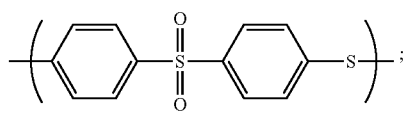

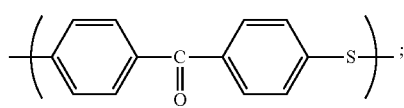

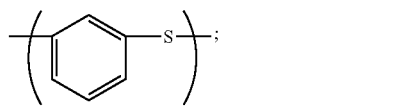

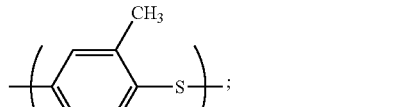

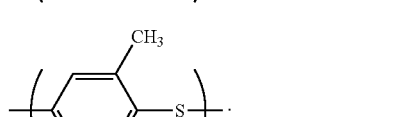

When the polyphenylene sulfide polymer includes one or more of the above repeating units (II), (III), (IV), (V), (VI), (VII) and (VIII), the melting point of the polyphenylene sulfide polymer is lower, and from the viewpoint of moulding, it is more favorable.

In view of achieving excellent flowability, the polyphenylene sulfide polymer used in the invention further preferably has a high melting index. For example, the melting index is preferably equal to or higher than 200 g/10 min, and further preferably equal to or higher than 500 g/10 min. With regard to the upper limit, in view of achieving excellent toughness, the melting index is preferably equal to or lower than 5,000 g/10 min.

The polyphenylene sulfide polymer (A) with the above structures (I) to (VIII) may be prepared by a method for achieving higher flowability, which is recorded in Japanese Examined Patent Publication No. 45-3368 or a method for achieving lower flowability, which is recorded in Japanese Examined Patent Publication No. 52-12240. The difference between the former and the latter is whether a polymerization system contains alkali metal carboxylate which is a polymerization promoter. In the former method, no alkali metal carboxylate is added into the polymerization system, so the flowability is higher; in the latter method, the alkali metal carboxylate is added into the polymerization system, so the flowability is lower, and it is favorable for the toughness of the resin. Therefore, the polyphenylene sulfide polymers prepared by the two methods can be combined for use, and the flowability and the toughness of the polyphenylene sulfide resin can be balanced.

In addition, the above prepared polyphenylene sulfide polymers are subjected to end-capping treatment, thus obtaining a polyphenylene sulfide polymer with lower chlorine content. For example, the end-capping treatment is carried out by 2-mercapto benzimidazole under an alkaline condition, so that the end-capped polyphenylene sulfide polymer with lower chlorine content can be obtained.

Deformed Cross-Section Glass Fiber (B):

The deformed cross-section glass fiber (B) in the invention is a glass fiber, and the section of the single glass fiber is non-circular; the non-circular section can be represented by "flatness ratio". Here, the "flatness ratio" is illustrated according to FIG. 1, the section diagram of the single deformed cross-section glass fiber. As shown in FIG. 1, it supposes that the long edge of a rectangle with a minimum area, which is circumscribed to the section of the specially-shaped glass fiber, is a, and the short edge is b, so the "flatness ratio" is represented by a ratio (a/b) of the lengths of the long edge a to the short edge b, and the flatness ratios with different values represent different types of deformed cross-section glass fibers (B). When the deformed cross-section glass fiber (B) with the flatness ratio being equal to or larger than 1.1 is adopted, the resin composition can achieve higher flowability and toughness.

In view that the polyphenylene sulfide resin composition has excellent flowability and toughness, the flatness ratio of the deformed cross-section glass fiber (B) is preferably equal to or larger than 1.5. In view of the easiness of obtaining the deformed cross-section glass fiber, the flatness ratio is preferably equal to or smaller than 10; further preferably, the flatness ratio is 2 to 8, and even further preferably 2 to 4. The area of the section of the deformed cross-section glass fiber (B) is preferably 100 to 500 $\mu m^2$/piece, and further preferably 110 to 300 $\mu m^2$/piece.

Amorphous Resin (C) with the Glass-Transition Temperature Being Equal to or Higher Than 100° C.:

Under the slow action of outer force until the material is broken, the generated deformation is called a bending moment; the impact strength of the material is guaranteed, and the bending moment is increased at the same time, so its toughness may be further improved. In order to further improve the toughness of the polyphenylene sulfide resin composition, the amorphous resin (C) with the glass-transition temperature being equal to or higher than 100° C. is added into it.

The amorphous resin (C) with the glass-transition temperature being equal to or higher than 100° C. may be selected from: a cycloolefin polymer, polycarbonate, polyphenyl ether, amorphous aromatic ester, polysulfone, polyether sulfone, polyetherimide, polyamideimide, polyimide or one or more of the above copolymers. Wherein in view of the heat resistance and the compatibility, the amorphous resin (C) with the glass-transition temperature being equal to or higher than 140° C. is preferably added, and may be selected from: polycarbonate, polyphenyl ether, amorphous aromatic ester, polysulfone, polyether sulfone, polyetherimide, polyamideimide, polyimide or one or more of the above copolymers. In addition, chlorine elements may be introduced into the molecular ends of polysulfone and polyether sulfone in their manufacturing processes, so that with regard to polysulfone and polyether sulfone, end-capping treatment is adopted to keep the respective chlorine content lower than 1,000 ppm.

In view of achieving excellent flowability, the melting viscosity of the polyphenylene sulfide resin composition is preferably that the melting viscosity of a capillary rheometer with the shearing rate of 1,000 $s^{-1}$ under 315° C. is lower than 180 Pa·s, and further preferably equal to or lower than 160 Pa·s. In view of achieving excellent toughness, the melting viscosity of the capillary rheometer is preferably equal to or higher than 80 Pa·s, and further preferably equal to or higher than 100 Pa·s.

In view of two aspects, reduction of the influence on the environment and the flowability, the chlorine content of the polyphenylene sulfide resin composition is equal to or lower than 1,000 ppm. The measurement of the chlorine content refers to the European standard EN 14582: 2007.

In the polyphenylene sulfide resin composition of the invention, the polyphenylene sulfide resin (A) is excellent in both rigidity and toughness. In view of the influence of the amorphous resin (C) with the glass-transition temperature being equal to or higher than 100° C. on the polyphenylene sulfide resin composition on its performance, preferably: the amorphous resin (C) with the glass-transition temperature being equal to or higher than 100° C. generates "islands" dispersion in the polyphenylene sulfide resin composition, and the "islands" are amorphous resin with irregular shapes, and are dispersed in the polyphenylene sulfide resin composition as dispersing phases. The average area of these "islands" is smaller than 1 $\mu m^2$/piece. Further preferably: the amorphous resin (C) with the glass-transition temperature being equal to or higher than 100° C. generates "islands" dispersion in the polyphenylene sulfide resin composition, and the average area of these "islands" is smaller than 0.5 $\mu m^2$/piece. Even further preferably: the amorphous resin (C) with the glass-transition temperature being equal to or higher than 100° C. generates "islands" dispersion in the polyphenylene sulfide resin composition, and the average area of these "islands" is smaller than 0.3 $\mu m^2$/piece. If the average area of these "islands" formed by the amorphous resin (C) with the glass-transition temperature being equal to or higher than 100° C. is larger than 1 $\mu m^2$/piece, the toughness improving effect is probably not obvious.

The average area of the "islands" in the invention is obtained by the following method. That is, the polyphenylene sulfide resin composition is observed under a microscope, and the "islands" formed by the amorphous resin are determined by an element analysis method; the areas of any 100 "islands" are measured, and arrayed from large to small, which are a1, a2, a3, . . . , a100; the areas of the 80 "islands" from a11 to a90 are subjected to arithmetic mean, and obtained values are designated as the average areas of these "islands". In addition, if the average areas of the 80 "islands" have a large mutual deviation; then the areas of another 100 "islands" are measured, and arrayed from large to small, which are b1, b2, b3, . . . , b100; the areas of the 80 "islands" from b11 to b90 and the areas of the 80 "islands" from a11 to a90 are subjected to arithmetic mean together, and obtained values are designated as the average areas of these "islands". For example, the polyphenylene sulfide resin composition is injection-moulded into a standard spline (a spline mould is 10 mm in width×4 mm in thickness); the section of the spline is cut into thin sheets, and is observed under a JEM-2100F field emission high-resolution transmission electron microscope, and the magnifying power is 10,000 to 20,000 times; the "islands" formed by the amorphous resin in the polyphenylene sulfide resin composition are determined by making use of an Electron Energy Loss Spectroscopy (EELS), and the average areas of these "islands" can be calculated by Leica Qwin image analysis software, and the obtained areas divide the number of "islands" to obtain the average areas of the "islands". The specific calculating method in the invention is as follows; the areas of any 100 "islands" are measured, and arrayed from large to small, which are a1, a2, a3, . . . , a100; the areas of the 80 "islands" from a11 to a90 are subjected to arithmetic mean, and obtained values are designated as the average areas of these "islands".

In addition, within a scope of not damaging the effect of the invention, the polyphenylene sulfide resin composition further includes an elastomer. By the adding of the elastomer which can be cooperated with the amorphous resin (C), the toughness of the polyphenylene sulfide resin composition is even further improved.

The elastomer can be listed as follows: one or more of an olefin elastomer, a modified olefin elastomer and a styrene elastomer.

(1) The Olefin Elastomer:

For example, the olefin elastomer includes: independent alpha-olefins such as ethylene, propylene, 1-butene, 1-amylene, 4-methyl-1-amylene and isobutene or a polymer or a copolymer obtained by polymerization of multiple alpha-olefins above, and a copolymer of alpha-olefin and alpha, beta-unsaturated acids such as acrylic acid, methyl acrylate, ethyl acrylate, butyl acrylate, methacrylic acid, methyl methacrylate, ethyl methacrylate and butyl methacrylate and alkyl ester thereof. In view of the excellent toughness, preferably: polyethylene, polypropylene, an ethylene/propylene copolymer, an ethylene/1-butene copolymer, an ethylene/methyl acrylate copolymer, an ethylene/ethyl acrylate copolymer, an ethylene/butyl acrylate copolymer, an ethylene/methyl methacrylate copolymer, an ethylene/ethyl methacrylate copolymer, an ethylene/butyl methacrylate copolymer, a propylene/maleic anhydride copolymer, or an isobutene/maleic anhydride copolymer.

(2) The Modified Olefin Elastomer:

The modified olefin elastomer may be obtained by introducing a monomer component (a component with a functional group) with a functional group such as an epoxy group, an anhydride group and an ionic bond polymer into the above olefin elastomer. The component with the functional group can be listed as follows: a monomer containing the anhydride group, such as maleic anhydride, itaconic anhydride, citraconic anhydride, bicyclolactone (2,2,1)5-heptylene-2,3-dicarboxylic acid and bicyclolactone (2,2,1) 5-heptylene-2,3-dicarboxylic anhydride, a monomer containing the epoxy group, such as glycidyl acrylate, glycidyl methacrylate, ethylacrylic acid glycidyl ester, itaconic acid glycidyl ester and citraconic acid glycidyl ester, or a monomer containing the ionic bond polymer, such as a carboxylic acid metal complex.

There is no special definition to the method for introducing these monomer components containing the functional groups, and the following method may be adopted: copolymerizing the monomer components with the olefin (co) polymer which has the same components and is used by the olefin elastomer; or a method for grafting and introducing a radical initiator into the olefin (co)polymer. With respect to all the monomers forming the olefin (co)polymer, the introduction quantity of the components containing the functional groups is 0.001 to 40 mole percent, and preferably 0.01 to 35 mole percent.

The specifically available olefin (co)polymer obtained by introducing the monomer component with the functional group such as the epoxy group, the anhydride group or the ionic bond polymer into the olefin polymer may be listed as follows: an ethylene/propylene-g-glycidyl methacrylate copolymer ("g" represents grafting, and the following is the same), an ethylene/1-butene-g-glycidyl methacrylate copolymer, an ethylene/glycidyl acrylate copolymer, an ethylene/glycidyl methacrylate copolymer, an ethylene/methyl acrylate/glycidyl methacrylate copolymer, an ethylene/methyl methacrylate/glycidyl methacrylate copolymer, an ethylene/propylene-g-maleic anhydride copolymer, an ethylene/1-butene-g-maleic anhydride copolymer, an ethylene/methyl acrylate-g-maleic anhydride copolymer, an ethylene/ethyl acrylate-g-maleic anhydride copolymer, an ethylene/methyl methacrylate-g-maleic anhydride copolymer, an ethylene/ethyl methacrylate-g-maleic anhydride copolymer, a zinc complex of the ethylene/methacrylic acid copolymer, a magnesium complex of the ethylene/methacrylic acid copolymer or a sodium complex of the ethylene/methacrylic acid copolymer.

In view of the compatibility, preferably: the ethylene/glycidyl methacrylate copolymer, the ethylene/methyl acrylate/glycidyl methacrylate copolymer, the ethylene/methyl methacrylate/glycidyl methacrylate copolymer, the ethylene/1-butene-g-maleic anhydride copolymer, or the ethylene/ethyl acrylate-g-maleic anhydride copolymer.

Further preferably: the ethylene/glycidyl methacrylate copolymer, the ethylene/methyl acrylate/glycidyl methacrylate copolymer, or the ethylene/methyl acrylate/glycidyl methacrylate copolymer.

(3) The Styrene Elastomer:

The styrene elastomer may be listed as follows: a styrene/butadiene copolymer, a styrene/ethylene/butadiene copolymer, a styrene/ethylene/propylene copolymer, or a styrene/isoprene copolymer; in view of the compatibility, the styrene/butadiene copolymer is preferred.

In view of two aspects, the flowability and toughness, the total weight part of the elastomer is preferably: 0.5 to 20 weight parts relative to 100 weight parts of the polyphenylene sulfide resin (A), and further preferably 0.8 to 10 weight parts, even further preferably 1 to 6 weight parts; in addition, within the scope of not affecting the effect of the invention, multiple elastomers can be combined for use.

In addition, within the scope of not damaging the effect of the invention, the polyphenylene sulfide resin composition further includes one or more of compatilizers such as a silane compound and a titanic acid type compound.

The silane compound may be listed as follows: one or more of an epoxy group-containing alkoxy silane compound such as gamma-epoxy glycero-propyl trimethoxy silane, gamma-epoxy glycero-propyl triethoxysilane, or beta-(3,4-epoxy cyclohexyl)ethyl trimethoxy silane, a sulfydryl-containing alkoxy silane compound such as gamma-sulfydryl propyl trimethoxy silane and gamma-sulfydryl propyl methyldimethoxysilane, a ureido-containing alkoxy silane compound such as gamma-ureido propyl triethoxysilane, gamma-ureido propyl trimethoxy silane, or gamma-(2-ureido ethyl)amino propyl trimethoxy silane, an isocyanate group-containing alkoxy silane compound such as gamma-isocyanate propyl trimethoxy silane, gamma-isocyanate propyl methyl dimethoxy silane, gamma-isocyanate propyl diethoxymethylsilane, gamma-isocyanate propyl ethyl dimethoxy silane, gamma-isocyanate propyl diethoxymethylsilane, gamma-isocyanate propyl diethyldiethoxysilane, or gamma-isocyanate propyl trichlorosilane, an amino-containing alkoxysilane compound such as gamma-(2-amino ethyl)

amino propyl methyl dimethoxy silane, gamma-(2-amino ethyl)amino propyl methyl trimethoxysilane, or gamma-amino propyl trimethoxy silane, and a hydroxyl-containing alkoxy silane compound such as gamma-hydroxyl propyl trimethoxy silane, or a gamma-hydroxyl propyl triethoxysilane.

The titanate compound may be listed as follows: one or more of isopropyl di-oleic acid acyloxy (dioctyl phosphoric acid acyloxy) titanate, isopropyl tri-oleic acid acyloxy titanate, tri-isostearic acid isopropyl titanate, a complex of tri-isostearic acid isopropyl titanate, di(dioctyloxy pyrophosphate) ethylene titanate, or tetra-isopropyl di(dioctyl phosphite acyloxy) ethylene titanate.

In view of the compatibility combined with the flowability and the toughness, there are totally preferably 0.01 to 3 weight parts of the silane compound and/or the titanate compound relative to the 100 weight parts of the polyphenylene sulfide resin (A), further preferably 0.05 to 2 weight parts, and even further preferably 0.1 to 2 weight parts. By the adding of such a compatilizer, the excellent flowability of the polyphenylene sulfide resin composition can be guaranteed, and its toughness is improved. If the weight part of the compatilizer is lower than 0.01, the compatible effect may not be achieved; if the weight part is larger than 3, the flowability of the polyphenylene sulfide resin composition may be reduced, and the gas amount may be increased during injection moulding. In addition, within the scope of not affecting the effect of the invention, multiple silane compounds or multiple titanate compounds can be combined for use.

In addition, within the scope of not damaging the effect of the invention, the polyphenylene sulfide resin composition may contain an antioxidant, thus further improving the heat resistance and the heat stability of the resin composition. The antioxidant can be either a phenol oxidant or a phosphorus type antioxidant.

(1) The Phenol Oxidant:

As the phenol oxidant, a hindered phenol oxidant is preferably adopted, which can be listed as follows: triethylene glycol di(3-tertiary butyl-(5-methyl-4-hydroxy phenyl)propionate), N,N'-hexamethylene di(3,5-ditertiary butyl-4-hydroxy-hydrocinnamamide, tetra(methylene-3-(3', 5'-ditertiary butyl-4'-hydroxy phenyl)propionate)methane, pentaerythritol tetra-(3-(3',5'-ditertiary butyl)-4'-hydroxy phenyl)propionate), 1,3,5-tri(3,5-ditertiary butyl-4-hydroxy benzyl)-s-triazine-2,4,6-(1H, 3H, 5H)-triketone, 1,1,3-tri(2-methyl-4-hydroxy-5-tertiary butyl phenyl)butane, 4,4'-butylidene di(3-methyl-6-tertiary butyl phenyl), octadecane alkyl-3-(3,5-ditertiary butyl-4-hydroxy phenyl)propionate, 3,9-di(2-(3-(3-tertiary butyl-4-hydroxy-5-methyl phenyl) propionyloxy)-1,1-dimethylethyl)-2,4,8,10-tetrade-cano (5,5)undecane, or 1,3,5-trimethyl-2,4,6-tri-(3,5-ditertiary butyl-4-hydroxy benzyl)benzene. Wherein an ester type macromolecular hindered phenol type is preferred, and specifically one or more of tetra(methylene-3-(3',5'-ditertiary butyl-4'-hydroxy phenyl)propionate)methane, pentaerythritol tetra-(3-(3',5'-ditertiary butyl)-4'-hydroxy phenyl)propionate), or 3,9-di(2-(3-(3-tertiary butyl-4-hydroxy-5-methyl phenyl)propionyloxy)-1,1-dimethylethyl)-2,4,8, 10-tetrade-cano (5,5)undecane is preferred.

(2) The Phosphorus Type Antioxidant

The phosphorus type antioxidant may be listed as follows: one or more of di(2,6-ditertiary butyl-4-methyl phenyl) pentaerythritol-diphosphite, di(2,4-ditertiary butyl phenyl) pentaerythritol-diphosphite, di(2,4-dicumenyl phenyl)pentaerythritol-diphosphite, tri(2,4-ditertiarybutyl phenyl) phosphite ester, tetra(2,4-ditertiary butyl phenyl)-4,4'-diphenylene phosphite ester, distearoyl pentaerythritol-diphosphite, triphenyl phosphite ester, or 3,5-dibutyl-4-hydroxy benzyl phosphate diethyl ester.

There are 0.01 to 3 weight parts of antioxidant relative to 100 weight parts of the polyphenylene sulfide resin (A), preferably 0.05 to 2 weight parts, and more preferably 0.1 to 1 weight part.

In addition, within the scope of not affecting the effect of the invention, the polyphenylene sulfide resin composition further contains other components, for example: one or more of a filler (silicon dioxide, calcium carbonate, magnesium hydroxide, aluminum hydroxide, calcium hydroxide, glass beads, hollow glass micro beads, ceramic beads, boron nitride, molybdenum disulfide, wollastonite, aluminum oxide, graphite, metal powder, carbon powder, carbon nanotubes, potassium titanate whisker, aluminum borate whisker, oxygen gypsified zinc whisker, silicon carbide fibers, ceramic fibers, asbestos fibers, gypsum fibers, metal fiber polyacrylonitrile or asphalt carbon fibers, or mica, wherein in view of corrosion prevention, lubrication and durability, the calcium carbonate, the graphite, the glass beads, the hollow glass micro beads or the silicon dioxide are preferred, and particularly the calcium carbonate is most preferred), a demoulding agent (montanic acid and metal salt thereof, ester thereof, semi-ester thereof, stearyl alcohol, stearamide, amides, biurea or polyethylene wax, wherein in view of reduction of gas production during moulding, the amides is preferred), a pigment (cadmium sulfide, phthalocyanine or coloring carbon black masterbatch, etc.) a dye (nigrosine, etc.), a seed agent (talcum powder, titanium dioxide, kaoline, clay, or polyether-ether-ketone, etc.), a plasticizer (p-hydroxy octyl benzoate, or N-butylbenzenesulfonamide), an antistatic agent (an alkyl sulfate anion antistatic agent, a quaternary ammonium salt cation antistatic agent, a polyoxyethylene sorbide monostearate nonionic antistatic agent, or a betaine amphiprotic antistatic agent), and a flame retardant (hydroxides such as red phosphorus, phosphate, melamine cyanurate, magnesium hydroxide and aluminum hydroxide, ammonium polyphosphate, brominated polystyrene, brominated polyphenyl ether, brominated polycarbonate, brominated epoxy resin or a combination of these bromine flame retardants and antimonous oxide).

By the invention, the polyphenylene sulfide resin composition with low chlorine content and excellent flowability can be obtained and is particularly suitable for a thin-wall product with high toughness and high rigidity.

Therefore, the invention further provides a moulding prepared from the polyphenylene sulfide resin composition.

The thickness of the moulding is equal to or lower than 1.5 mm. The moulding with the thickness is a moulding that the ratio of the projection area of the thickness part (equal to or lower than 1.5 mm) to the orthographic projection area of the moulding is 50 percent or over.

The crystallization degree of the moulding is lower than 50 percent, which is an arithmetic mean value of the crystallization degrees of the positions, close to a pouring gate, on the upper and lower surfaces of the moulding.

The moulding prepared from the polyphenylene sulfide resin composition is excellent in rigidity and toughness in the thickness direction, high in moulding performance and high in mechanical strength, and is particularly suitable for products for forming frames of a portable computer, a mobile phone and a portable electronic device.

For the polyphenylene sulfide resin composition, high rigidity can be achieved under high crystallization degree. In view of the crystallization degree, the mould temperature during injection moulding is generally 130 to 160° C. Under such mould temperature, the crystallization degree of the moulding is 50 percent or over. Although the rigidity is improved, the toughness is reduced. Under such a circumstance, it is necessary to carry out injection moulding by low mould temperature; however, under the low mould temperature, there are the risks of reducing the crystallization degree and lowering the rigidity. A research shows that by the adoption of the polyphenylene sulfide resin composition, injection moulding is carried out under the mould temperature below the glass-transition temperature of the polyphenylene sulfide resin (A), and in view of convenience for moulding, the temperature is preferably 5 to 95° C., so that the moulding of which the crystallization degree is equal to or larger than 20 percent and smaller than 50 percent and both the rigidity and the toughness are high can be obtained from the polyphenylene sulfide resin composition.

Therefore, the invention further provides a manufacturing process of the moulding from the polyphenylene sulfide resin composition. A cut plastic thin film is firstly put into the mould by an in-mould insert injection or in-mould transfer moulding technology, and then the polyphenylene sulfide resin composition is moulded by an injection moulding machine. The mould temperature is lower than the glass-transition temperature of the polyphenylene sulfide resin (A). In view of convenience for moulding, the mould temperature is preferably 5 to 95° C.

The polyphenylene sulfide resin composition according to the invention is excellent in flowability, low in chlorine content, low in influence on the environment and obvious in advantage during injection moulding of a thin product with high toughness and rigidity, and is particularly suitable for moulding the products for forming frames of a light, thin and firm portable computer, a mobile phone and a portable electronic device.

BRIEF DESCRIPTION OF THE DRAWINGS

FIG. 1 shows an illustration of the section of the deformed cross-section glass fiber.

Wherein a: the long edge of the rectangle with a minimum area, which is circumscribed to the section of the specially-shaped glass fiber, b: the short edge of the rectangle with a minimum area, which is circumscribed to the section of the specially-shaped glass fiber.

DETAILED DESCRIPTION OF THE EMBODIMENTS

The invention is described below with reference to examples in detail, and the following examples are implemented on the premise of the technical scheme of the invention, which provide detailed implementation modes and specific operation processes. However, the scope of protection of the invention is not limited to the examples below.

1. Description of Raw Materials

The polyphenylene sulfide polymer, the deformed cross-section glass fiber, the amorphous resin and other unnecessary additives for the described examples and Comparative Examples below are selected from the following materials shown from (1) to (11):

(1) a polyphenylene sulfide polymer (PPS for short below)

a. Manufacturing of PPS-1

2,383 grams of a 47 mass percent sodium hydrosulfide (20.0 mole) aqueous solution, 836 grams of a 96 mass percent sodium hydroxide (20.1 mole) aqueous solution, 3,960 grams (40.0 mole) of N-methyl-2-pyrrolidinone (NMP), 313 grams (3.81 mole) of sodium acetate and 3,000 grams of deionized water were put into a 20-liter high-pressure kettle with a stirrer and a bottom valve. The kettle was fed with nitrogen under normal pressure, and slowly heated to 225° C. within 3 hours. After distilling of 4,200 grams of water and 80 grams of NMP, the reactor was cooled to 160° C.

3,031 grams (20.6 mole) of p-dichlorobenzene and 1,515 grams (15.3 mole) of NMP were added, after which the reaction container was sealed under the nitrogen, heated from 200° C. to 225° C. at the heating rate of 0.8° C./min under stirring at the speed of 400 rpm, and retained for 30 minutes. Then the reaction container was heated to 274° C. at the heating rate of 0.3° C./min, and retained for 40 minutes. Then it was heated to 282° C. The bottom valve of the high-pressure kettle was opened, the nitrogen was pressurized to flash the mixture in the container into a container with a stirrer, after which the mixture was stirred under 250° C. for a while to remove most NMP, and solid substances including PPS and salts were recovered.

The obtained solid substances and 15,000 grams of deionized water were added into the high-pressure kettle with the stirrer, which was then subjected to cleaning under 70° C. for 30 minutes, filtering and washing with deionized water, thus a filter cake was obtained.

The obtained filter cake and 12,000 grams of deionized water were added into the high-pressure kettle with the stirrer, and air in the high-pressure kettle was replaced with nitrogen, followed by heating to 192° C., retaining for 30 minutes, and cooling the high-pressure kettle, and substances in the kettle were taken out. The substances were subjected to filtering, washing with an aqueous solution of acetic acid with the mass concentration of 33 percent, filtering again, and washing with the deionized water to obtain a filter cake. The filter cake was dried in hot air under 80° C. for 1 hour, and then dried under 120° C. in vacuum for 24 hours, thus obtaining dried PPS-1.

The melting index of the obtained PPS-1 was 760 g/10 min, and the chlorine content was 1,400 ppm. The measurement of the chlorine content referred to the European standard EN 14582: 2007.

b. Manufacturing of PPS-2

2,383 gram of a 47 mass percent sodium hydrosulfide (20.0 mole) aqueous solution, 831 grams of a 96 mass percent sodium hydroxide (19.9 mole) aqueous solution, 3,960 grams (40.0 mole) of N-methyl-2-pyrrolidinone (NMP) and 3,000 grams of deionized water were put into the 20-liter high-pressure kettle with a stirrer and a bottom valve. The kettle was fed with nitrogen under normal pressure, and slowly heated to 225° C. within 3 hours. After distilling off 4,200 grams of water and 80 grams of NMP, the reactor was cooled to 160° C.

4,410 grams (30 mole) of p-dichlorobenzene and 1,515 grams (15.3 mole) of NMP were added, after which the reaction container was sealed under the nitrogen, heated from 200° C. to 225° C. at the heating rate of 0.8° C./min under stirring at the speed of 400 rpm, and retained for 30 minutes. Then the reaction container was heated to 274° C. at the heating rate of 0.3° C./min, and retained for 30 minutes. Then it was heated to 282° C. The bottom valve of the high-pressure kettle was opened, and the nitrogen was pressurized to flash the mixture in the container into a container with a stirrer, after which the mixture was stirred under 250° C. for a while to remove most NMP, and solid substances including PPS and salts were recovered.

The obtained solid substances and 16,000 grams of deionized water were added into the high-pressure kettle with the stirrer, which was then subjected to cleaning under 70° C. for 30 minutes, filtering and washing with deionized water, thus a filter cake was obtained.

The obtained filter cake and 12,000 grams of deionized water were added into the high-pressure kettle with the stirrer, and air in the high-pressure kettle was replaced with nitrogen, followed by heating to 192° C., retaining for 30 minutes, and cooling the high-pressure kettle, and substances in the kettle were taken out. The substances were subjected to filtering, washing with an aqueous solution of acetic acid with the mass concentration of 50 percent, filtering again, and washing with the deionized water to obtain a filter cake. The filter cake was dried in hot air under 80° C. for 1 hour, and then dried under 120° C. in vacuum for 24 hours, thus obtaining dried PPS-2.

The melting index of the obtained PPS-2 was 4,500 g/10 min, and the chlorine content was 2,200 ppm. The measurement of the chlorine content referred to the European standard EN 14582: 2007.

c. Manufacturing of PPS-3

2,383 grams of a 47 mass percent sodium hydrosulfide (20.0 mole) aqueous solution, 836 grams of a 96 mass percent sodium hydroxide (20.1 mole) aqueous solution, 3,960 grams (40.0 mole) of N-methyl-2-pyrrolidinone (NNP), 205 grams (2.5 mole) of sodium acetate and 3,000 grams of deionized water were put into a 20-liter high-pressure kettle with a stirrer and a bottom valve. The kettle was fed with nitrogen under normal pressure, and slowly heated to 225° C. within 3 hours. After distilling off 4,200 grams of water and 80 grams of NMP, the reactor was cooled to 160° C.

3,028 grams (20.6 mole) of p-dichlorobenzene and 1,515 grams (15.3 mole) of NMP were added, after which the reaction container was sealed under the nitrogen, heated from 200° C. to 225° C. at the heating rate of 0.8° C./min under stirring at the speed of 400 rpm, and retained for 30 minutes. Then the reaction container was heated to 274° C. at the heating rate of 0.3° C./min, and retained for 35 minutes. Then it was heated to 282° C. The bottom valve of the high-pressure kettle was opened, and the nitrogen was pressurized to flash the mixture in the container into a container with a stirrer, after which the mixture was stirred under 250° C. for a while to remove most NMP, and solid substances including PPS and salts were recovered.

The obtained solid substances and 15,000 grams of deionized water were added into the high-pressure kettle with the stirrer, which was then subjected to cleaning under 70° C. for 30 minutes, filtering and washing with deionized water, thus a filter cake was obtained.

The obtained filter cake and 12,000 grams of deionized water were added into the high-pressure kettle with the stirrer, and air in the high-pressure kettle was replaced with nitrogen, followed by heating to 192° C., retaining for 30 minutes, and cooling the high-pressure kettle, and substances in the kettle were taken out. The substances were subjected to filtering, washing with an aqueous solution of acetic acid with the mass concentration of 33 percent, filtering again, and washing with the deionized water to obtain a filter cake. The filter cake was dried by hot air under 80° C. for 1 hour, and then dried under 120° C. in vacuum for 24 hours, thus obtaining dried PPS-3.

The melting index of the obtained PPS-3 was 850 g/10 min, and the chlorine content was 1,800 ppm. The measurement of the chlorine content referred to the European standard EN 14582: 2007.

d. Manufacturing of PPS-4

2,383 grams of a 47 mass percent sodium hydrosulfide (20.0 mole) aqueous solution, 836 grams of a 96 mass percent sodium hydroxide (20.1 mole) aqueous solution, 3,960 grams (40.0 mole) of N-methyl-2-pyrrolidinone (NMP), 328 grams (4.0 mole) of sodium acetate and 3,000 grams of deionized water were put into a 20-liter high-pressure kettle with a stirrer and a bottom valve. The kettle was fed with nitrogen under normal temperature, and was slowly heated to 225° C. within 3 hours. After distilling off 4,200 grams of water and 80 grams of NMP, the reactor was cooled to 160° C.

3,028 grams (20.6 mole) of p-dichlorobenzene and 1,515 grams (15.3 mole) of NMP were added, after which the reaction container was sealed under the nitrogen, and was heated from 200° C. to 227° C. at the heating rate of 0.8° C./min under stirring at the speed of 400 rpm, then heated to 270° C. at the heating rate of 0.6° C./min, and retained for 100 minutes. Then the reaction container was cooled to 250° C. at the cooling rate of 1.3° C./min, and 720 grams (40 mole) of deionized water was impressed into the high-pressure kettle at the same time; followed by cooling to 200° C. at the cooling rate of 0.4° C./min, then quickly cooling to temperature close to room temperature. After taking out and diluting the internal substances with 10 liters of NMP, a solvent and solid substances were filtered out by a sieve, and obtained particles were cleaned with 20 liters of deionized water for several times, and were filtered out. Then the particles were fed into the 10 liters of NMP heated to 100° C., which was then subjected to continuous stirring for 1 hour, filtering, and cleaning with the deionized water for several times. After washing with an aqueous solution of 50 percent acetic acid, filtering, and washing with the deionized water, PPS-4 particles were obtained. The particles were dried by hot air under 80° C. for 1 hour, and were dried under 120° C. for 24 hours, thus obtaining the dried PPS-4.

The melting index of the obtained PPS-4 was 600 g/10 min, and the chlorine content was 960 ppm. The measurement of the chlorine content referred to the European standard EN 14582: 2007.

e. Manufacturing of PPS-5

2,383 grams of a 47 mass percent sodium hydrosulfide (20.0 mole) aqueous solution, 831 grams of a 96 mass percent sodium hydroxide (19.9 mole) aqueous solution, 3,960 grams (40.0 mole) of N-methyl-2-pyrrolidinone (NMP) and 3,000 grams of deionized water were put into a 20-liter high-pressure kettle with a stirrer and a bottom valve. The kettle was fed with nitrogen under normal pressure, and slowly heated to 225° C. within 3 hours. After distilling off 4,200 grams of water and 80 grams of NMP, the reactor was cooled to 160° C.

4,116 grams (28 mole) of p-dichlorobenzene and 1,515 grams (15.3 mole) of NMP were added, after which the reaction container was sealed under the nitrogen, heated from 200° C. to 225° C. at the heating rate of 0.8° C./min under stirring at the speed of 400 rpm, and retained for 30 minutes. Then the reaction container was heated to 274° C.

at the heating rate of 0.3° C./min, and retained for 30 minutes. Then it was heated to 282° C. The bottom valve of the high-pressure kettle was opened, the nitrogen was pressurized to flash the mixture in the container into a container with a stirrer, after which the mixture was stirred under 250° C. for a while to remove most NMP, and solid substances including PPS and salts were recovered.

The obtained solid substances and 16,000 grams of deionized water were added into the high-pressure kettle with the stirrer, which was then subjected to cleaning under 70° C. for 30 minutes, filtering and washing with deionized water, thus a filter cake was obtained.

The obtained filter cake and 12,000 grams of deionized water were added into the high-pressure kettle with the stirrer, and air in the high-pressure kettle was replaced with nitrogen, followed by heating to 192° C., retaining for 30 minutes, and cooling the high-pressure kettle, and substances in the kettle were taken out. The substances were subjected to filtering, washing with an aqueous solution of acetic acid with the mass concentration of 50 percent, filtering again, and washing with the deionized water to obtain a filter cake. The filter cake was dried by hot air under 80° C. for 1 hour, and then dried under 120° C. in vacuum for 24 hours, thus obtaining dried PPS-5.

The melting index of the obtained PPS-5 was 4,000 g/10 min, and the chlorine content was 1,900 ppm. The measurement of the chlorine content referred to the European standard EN 14582: 2007.

f. Manufacturing of PPS-6

1,600 grams of the dried PPS-5, 0.65 mol of 2-mercapto benzimidazole, 0.65 mol of NaOH and 5 liters of NMP were put into the 20-liter high-pressure kettle. The system was sealed under the nitrogen atmosphere, stirred and heated to 260° C., and was allowed to undergo reaction for 1 hour. After reaction, the system was decompressed to distil off and recover NMP. After adding water into the reactants, retaining under 200° C. for 4 hours, washing, filtering and drying the product, the end-capped PPS-6 was obtained.

The melting index of the obtained PPS-6 was 5,000 g/10 min, and the chlorine content was 80 ppm. The measurement of the chlorine content referred to the European standard EN 14582: 2007.

(2) The deformed cross-section glass fiber was such a deformed cross-section glass fiber which was manufactured by Nittobo and had the flatness ratio of 4 or 2; a circular-section glass fiber serving as a Comparative Example was manufactured by Nippon Electric Glass Co., Ltd., and the diameter of a single fiber was 10.5 μm.

(3) Amorphous resin with the glass-transition temperature being equal to or higher than 100° C.

polycarbonate (Tg=145° C.), Idemitsu A1900;
polyphenyl ether powder (Tg=211° C.), Aldrich;
amorphous polyarylate (Tg=195° C.), Unitika U-100;
polysulfone (Tg=190° C.), Solvay P-1700;
polyether sulfone 4800 P (Tg=220° C.), Sumitomo Chemical;
polyetherimide (Tg=215° C.), Sabic Ultem 1010;
polyamideimide (Tg=250 to 300° C.), Toray TI-5000;
polyimide (Tg=265° C.), Mitsui Chemicals E-2021;
polysulfone and polyether sulfone were subjected to end-capping treatment, so that the respective chlorine contents were 500 ppm.

(4) polystyrene Mw 350,000 (Tg=95° C.), Aldrich, serving as the amorphous resin with the glass-transition temperature being equal to or lower than 100° C.;

(5) silane compound (beta-(3,4-epoxy cyclohexyl)ethyl trimethoxy silane, gamma-epoxy glycero-propyl trimethoxy silane, gamma-amino propyl trimethoxy silane), Shin-Etsu Chemical;

(6) titanate compound (tri-isostearic acid isopropyl titanate), Nanjing Up Chemical;

(7) elastomer
polypropylene-g-maleic anhydride, poly(isobutene-alt-maleic anhydride) and poly(ethylene co-propylene), Aldrich;
poly(ethylene co-glycidyl methacrylate), Sumitomo Chemical;

(8) additive
calcium carbonate, Calfine Co., Ltd., Kanehira Factory;

(9) antioxidant
pentaerythritol tetra(3-(3',5'-ditertiary butyl)-4'-hydroxy phenyl)propionate, Sinopharm Chemical;

(10) Demoulding agent
oxidized polyethylene wax (1160H), Mitsui Chemicals;
high-melting-point amide (WH-225), Kyoeisha Chemical Co., Ltd.;

(11) pigment
carbon black masterbatch (flame-retardant level), Boss Prod Chemicals.

2. Various Tests

Test and Calculation of the Melting Index:

With reference to the standard ISO01133-2005, the weight (gram) of a substance flowing out of a capillary within 10 seconds was weighed under the load of 2.16 Kg at 315° C. by adopting the melt indexer F-B01 manufactured by Toyo Seiki Seisaku-Sho, Ltd. The value was converted into the weight (gram) of the substance flowing out of the capillary within 10 minutes, and recorded as the melting index.

Test of the Melting Viscosity of a Capillary Rheometer:

The dried polyphenylene sulfide resin composition particles were put into the capillary rheometer 140-SAS-2002 manufactured by Yasuda Seiki seisakusho LTD. to perform flowability test under 315° C. at the shearing rate of 1,000 $s^{-1}$, and a melting viscosity value was obtained.

Test of Recrystallization Temperature and Crystallization Degree:

2 to 3 mg of the polyphenylene sulfide resin composition particles which were extruded to be granulated and dried was cut with a cutter; for a moulding, a small sheet (which is 0.5 mm in thickness) was cut off with the cutter along the surface from a position near to the pouring gate at 2 cm, and was recorded as a lower surface section. Then a small sheet (which is 0.5 mm in thickness) was cut off with the cutter along the surface from the back surface of one side of the pouring gate, followed by scraping off the plastic thin film on its surface with the cutter, and the small sheet was recorded as an upper surface section. Testing was performed for the recrystallization temperatures and the crystallization degrees of the materials cut by the cutter or the upper and lower surface sections of the moulding according to the procedure below: recording the recrystallization temperature and the crystallization degree of the material cut from the particle as the recrystallization temperature and the crystallization degree of the polyphenylene sulfide resin composition, and recording arithmetic mean values of the recrystallization temperatures and the crystallization degrees of the upper and lower surface sections as the recrystallization temperature and the crystallization degree of the moulding.

The polyphenylene sulfide resin composition particles were put into a sample disk of a TA-Q100 differential scanning calorimeter (DSC), and the cut weight (mg) was inputted into the procedure, followed by heating from the room temperature to 340° C. under the nitrogen atmosphere at the heating rate of 20° C./min, stabilizing the temperature for 3 minutes, eliminating the heat history, and this step was recorded as cycle 1; cooling from 340° C. to the room temperature at the cooling rate of 20° C./min, and this step was recorded as cycle 2; heating from the room temperature to 340° C. at the heating rate of 20° C./min again, stabilizing the temperature for 3 minutes, and this step was recorded as cycle 3; cooling from 340° C. to the room temperature at the cooling rate of 20° C./min again, and this step was recorded as cycle 4. A crystallization peak in the cycle 4 was integrated by integrating software of the DSC, thus the recrystallization temperature and the area S of the crystallization peak was obtained. In addition, the content by weight of the polyphenylene sulfide resin composition particles for DSC test or the polyphenylene sulfide resin in the moulding was recorded as w (%), and the crystallization degree was calculated according to formula (1).

Crystallization degree=S/W×100%/77.5    Formula (1)

The glass-transition temperature refers to: Polymer Handbook, version IV, J. Brandrup etc., published by Wiley-Interscience, 1999.

Form Observation:

The amorphous resin (C) was dispersed in the polyphenylene sulfide resin composition.

The polyphenylene sulfide resin composition was injection-moulded into a standard spline (a spline mould is 10 mm in width×4 mm in thickness); the section of the spline was cut into thin sheets, and was observed under a JEM-2100F field emission high-resolution transmission electron microscope, and the magnifying power was 10,000 to 20,000 times; the "islands" formed by the amorphous resin in the polyphenylene sulfide resin composition were determined by making use of an Electron Energy Loss Spectroscopy (EELS), and the average areas of these "islands" could be calculated by Leica Qwin image analysis software, and the obtained areas divided the number of "islands" to obtain the average areas of these "islands". The specific calculating method in the invention was as follows: the areas of any 100 "islands" were measured, and arrayed from large to small, which are a1, a2, a3, . . . , a100; the areas of the 80 "islands" from a11 to a90 were subjected to arithmetic mean, and obtained values were designated as the average areas of these "islands".

Test of the Rigidity and Toughness Performances:

Measuring a bending modulus and a bending moment with an injection-moulded standard spline according to the standard ISO0178, wherein the bending rate is 2 mm/rain, and a mean value is obtained from every group of 5 splines.

Measuring the Charpy notched impact strength with the injection-moulded standard spline according to the standard ISO0179, wherein a mean value was obtained from every group of 5 splines.

The bending modulus reflected the rigidity of the polyphenylene sulfide resin composition; if the modulus was large, the rigidity was high, and otherwise, the rigidity was low.

The Charpy notched impact strength reflected the toughness of the polyphenylene sulfide resin composition under instant impact; if the strength was higher, the impact strength of the material was high; the bending moment was a deformation produced by slowly applying outer force to the material until the material was broken, and reflected the ductility of the material. It was a measure of improving the toughness of the material to guarantee the Charpy notched impact strength of the material while improving the bending moment of the material.

Examples 1 to 27

The raw materials were as shown in Table 1-1, Table 1-1 (continuation), Table 2-1 and Table 2-1 (continuation) Granulation was realized by a TEX30a type biaxial extruder (L/D=45.5) made by Japan Steel Works, LTD., and the extruder had 13 heating regions and was provided with two material feeding devices with meters and vacuum exhaust equipment. Except for the glass fiber, other raw materials were fed from a main material feeding opening of the extruder after being mixed in a high-speed mixing machine, and the glass fiber was added from a side material feeding opening of the extruder; the extruder temperature was set to be 200 to 330° C., and the granular polyphenylene sulfide resin composition was obtained by melting, extrusion, cooling and granulation; the granular object was dried in a drying oven with the temperature of 130° C. for 3 hours, and was moulded into a spline meeting the ISO standard (a spline mould was 10 mm in width×4 mm in thickness), and the performance test was performed according to the above test method. Table 1-2, Table 1-2 (continuation), Table 2-2 and Table 2-2 (continuation) records physical property measurement results of the respective Examples.

When the Example 21 was compared with the Example 13, no amorphous resin polyetherimide (C) with the glass-transition temperature being equal to or higher than 100° C. was added, so no "islands" formed by the amorphous resin in the polyphenylene sulfide resin composition could be observed. The Charpy notched impact strength of the polyphenylene sulfide resin composition was 11 kJ/m$^2$, which was lower than 13 kJ/m$^2$ of the Example 13; the bending moment of the polyphenylene sulfide resin composition was 2.3 mm, which was lower than 3.2 mm of the Example 13.

When the Example 22 was compared with the Example 15, the content by weight of the deformed cross-section glass fiber (B) was increased, and there were 225 weight parts of deformed cross-section glass fiber (B) relative to 100 weight parts of polyphenylene sulfide resin (A). The melting viscosity of the capillary rheometer of the polyphenylene sulfide resin composition was 169 Pa·s, and the flowability was reduced; the bending modulus of 28 GPa and the Charpy notched impact strength of 19 kJ/m$^2$ were higher than the bending modulus of 17 GPa and the Charpy notched impact strength of 13 kJ/m$^2$ of the Example 15, but its bending moment was 2.0 mm, which was lower than the bending moment of 3.2 mm of the Example 15.

When the Example 23 was compared with the Example 16, the weight part of the amorphous resin polyamideimide (C) was reduced, which was 0.5 weight part, relative to 100 weight part of the polyphenylene sulfide resin (A). The Charpy notched impact strength of the polyphenylene sulfide resin composition was 11 kJ/m$^2$, which was lower than that of 14 kJ/m$^2$ of the Example 16, and the bending moment of the polyphenylene sulfide resin composition was 2.4 mm, which was lower than that of 3.3 mm of the Example 16.

When the Example 24 was compared with the Example 13, polyetherimide was replaced with polystyrene (which was amorphous resin and had the glass-transition temperature of 95° C.), and no "island" formed by polystyrene in the polyphenylene sulfide resin composition was observed, it speculated that polystyrene was degraded in an extrusion process. The melting viscosity of the capillary rheometer of the polyphenylene sulfide resin composition was 185 Pa·s, which was higher than that of 120 Pa·s of the Example 13, so the flowability was reduced; its bending modulus was 14 GPa, which was lower than that of 16 GPa of the Example 13, so the rigidity was lowered; its Charpy notched impact strength was 10 kJ/m$^2$, which was lower than that of 13 kJ/m$^2$ of the Example 13, and its bending moment was 2.7 mm, which was lower than that of 3.2 mm of the Example 13, so the toughness was lowered.

When the Example 25 was compared with the Example 13, no silane compound serving as a compatilizer was added, and the average area of the "island" was observed to be 1.5 μm$^2$; the Charpy notched impact strength was 11 kJ/m$^2$, which was lower than that of 13 kJ/m$^2$ of the Example 13, and the bending moment was 2.9 mm, which was lower than that of 3.2 mm of the Example 13, so the toughness was lower than that of the Example 13.

When the Example 27 was compared with the Example 13, a small amount of silane compound serving as a compatilizer was added, and the average area of the "island" was observed to be 0.9 μm$^2$; the Charpy notched impact strength was 11 kJ/m$^2$, which was lower than that of 13 kJ/m$^2$ of the Example 13, and the bending moment was 3.0 mm, which was lower than that of 3.2 mm of the Example 13, so the toughness was lower than that of the Example 13.

When the Example 26 is compared with the Example 13, no elastomer was added; the Charpy notched impact strength of the polyphenylene sulfide resin composition was 12 kJ/m$^2$, which was slightly lower than that of 13 kJ/m$^2$ of the Example 13, and the bending moment was 2.8 mm, which was lower than that of 3.2 mm of the Example 13, so the toughness was lower than that of the Example 13.

Comparative Example 1 (The Chlorine Content of the Polyphenylene Sulfide Resin Composition was Larger than 1,000 ppm)

The preparation method of the Comparative Example 1 was the same as the preparation methods of the Examples 1 to 27. The raw materials are as shown in Table 1-1 (continuation), and the physical property measurement results are as shown in Table 1-2 (continuation). The chlorine content of the polyphenylene sulfide resin composition is equal to or larger than 1,000 ppm; although its flowability is higher, and the melting viscosity of the capillary rheometer is 91 Pa·s, both the modulus and the Charpy notched impact strength are low, which are respectively 9 GPa and 9 kJ/m$^2$, so the rigidity and the toughness are low.

Comparative Examples 2 and 3 (Circular-Section Glass Fiber was Adopted)

The preparation methods of the Comparative Examples 2 and 3 were the same as the preparation methods of the Examples 1 to 27. The raw materials were as shown in Table 2-1 (continuation), and the physical property measurement results are as shown in Table 2-2 (continuation).

As a Comparative Example of the Example 21, the Comparative Example 2 manufactured the polyphenylene sulfide resin composition by the circular-section glass fiber. Therefore, the Charpy notched impact strength of the polyphenylene sulfide resin composition was extremely low, which was 7 kJ/m$^2$ and lower than that of 11 kJ/m$^2$ of the Example 21, and the bending moment of the polyphenylene sulfide resin composition was extremely low, which was 1.5 mm and lower than that of 2.3 mm of the Example 21, so the toughness of the polyphenylene sulfide resin composition was lower.

As a Comparative Example of the Example 17, the Comparative Example 3 manufactured the polyphenylene sulfide resin composition by the circular-section glass fiber. Therefore, the melting viscosity of the capillary rheometer of the polyphenylene sulfide resin composition was enhanced, which was 155 Pa·s, so the flowability was lowered; its Charpy notched impact strength was extremely low, which was 9 kJ/m$^2$ and lower than that of 13 kJ/m$^2$ of the Example 17, and its bending moment was 2.3 mm, which was lower than that of 3.1 mm of the Example 17, so the toughness was lower.

Examples 28 to 33

In the Examples 28 to 33, an in-mould insert injection moulding technology was adopted to prepare a moulding with a plastic thin film on the surface. Firstly, a cut Polyethylene Terephthalate (PET) thin film (length 380 mm×width 250 mm) was put into a mould, and the temperature of mould was as shown in Table 3-1; then an injection moulding machine injected the granular polyphenylene sulfide resin composition obtained in the Example 13 into the PET thin film in the mould, thus obtaining the moulding (length 380 mm×width 250 mm×thickness 1.3 mm) with the PET thin film on the surface.

The rectangular spline (length 100 mm×width 13 mm×thickness 1.3 mm) was cut from the obtained moulding from the pouring line along the width direction, and was subjected to tests on the crystallization degree, the bending moment and the bending modulus, and results are as shown in Table 3-1. For the Examples 28 to 33, with the temperature of the mould reduced from 90° C. to 10° C., the crystallization degree was reduced from 48 percent to 22 percent, the bending moment was increased from 8.5 mm to 11.2 mm, and the bending modulus was unchanged.

TABLE 1-1

| | Component | Unit | Example 1 | Example 2 | Example 3 | Example 4 | Example 5 |
|---|---|---|---|---|---|---|---|
| PPS | PPS-1 | Weight part | 33 | 27 | 33 | 33 | 70 |
| | PPS-2 | Weight part | 67 | 73 | 67 | 67 | 30 |
| Elastomer | Polypropylene-g-maleic anhydride | Weight part | 2.2 | | | 2.2 | |
| | Poly(isobutene-alt-maleic anhydride) | Weight part | 2.2 | | 2.2 | | 1.7 |
| | Poly(ethylene-co-glycidyl methacrylate) | Weight part | | 2.2 | 2.2 | 2.2 | |
| | Poly(ethylene-co-propylene) | Weight part | | 2.2 | | | |
| Glass fiber | Flatness ratio 4 | Weight part | 100 | 98 | | | 58 |
| | Flatness ratio 2 | Weight part | | | 100 | 100 | |
| Glass fiber | Flatness ratio 1 (Circular section) | Weight part | | | | | |
| Additive | Calcium carbonate | Weight part | 6.7 | 6.7 | 6.7 | 2.2 | 1.7 |
| Antioxidant | Pentaerythritol tetra(3-(3',5'-ditertiary butyl)-4'-hydroxy-phenyl)propionate | Weight part | | | | | 0.8 |
| Silane compound | Beta-(3,4-epoxy cyclohexyl) ethyl trimethoxy silane | Weight part | | 0.4 | | | |
| | Gamma-epoxy glycero-propyl trimethoxy silane | Weight part | 0.4 | | 0.4 | | |
| | Gamma-amino propyl trimethoxy silane | Weight part | | | | 0.4 | 0.3 |
| Titanate compound | Tri-isostearic acid isopropyl titanate | Weight part | | | | | |
| Amorphous resin | Polycarbonate (Tg = 145° C.) | Weight part | | | | | |
| | Polyphenyl ether (Tg = 211° C.) | Weight part | 6.7 | | | | |
| | Amorphous polyarylate (Tg = 195° C.) | Weight part | | | | | 1.7 |
| | Polysulfone (Tg = 190° C.) | Weight part | | | | 11.1 | |
| | Polyether sulfone (Tg = 220° C.) | Weight part | | | | | |
| | Polyetherimide (Tg = 215° C.) | Weight part | | 8.9 | | | |
| | Polyamideimide (Tg = 250 to 300° C.) | Weight part | | | 6.7 | | |
| | Polyimide (Tg = 265° C.) | Weight part | | | | | |
| | Polystyrene (Tg = 95° C.) | Weight part | | | | | |
| Demoulding agent | Oxidized polyethylene wax | Weight part | 0.7 | 0.7 | 0.7 | 0.7 | 0.5 |
| Pigment | Carbon black masterbatch | Weight part | 3.3 | 3.3 | 3.3 | 3.3 | 1.7 |

| | Component | Unit | Example 6 | Example 7 | Example 8 | Example 9 | Comparative Example 1 |
|---|---|---|---|---|---|---|---|
| PPS | PPS-1 | Weight part | 17 | 14 | 100 | 29 | |
| | PPS-2 | Weight part | 83 | 86 | | 71 | 100 |
| Elastomer | Polypropylene-g-maleic anhydride | Weight part | | | 1.7 | | |
| | Poly(isobutene-alt-maleic anhydride) | Weight part | | 2.9 | | | |
| | Poly(ethylene-co-glycidyl methacrylate) | Weight part | 3.3 | 2.9 | | 2.9 | 2.2 |
| | Poly(ethylene-co-propylene) | Weight part | | | | 2.9 | 2.2 |

TABLE 1-1-continued

| | | | | | | |
|---|---|---|---|---|---|---|
| Glass fiber | Flatness ratio 4 | Weight part | 177 | | 50 | 40 |
| | Flatness ratio 2 | Weight part | | 171 | 143 | |
| Glass fiber | Flatness ratio 1 (Circular section) | Weight part | | | | |
| Additive | Calcium carbonate | Weight part | 13.3 | 2.5 | 8.6 | 6.7 |
| Antioxidant | Pentaerythritol tetra(3-(3',5'-ditertiary butyl)-4'-hydroxy-phenyl)propionate | Weight part | | 0.8 | | |
| Silane compound | Beta-(3,4-epoxy cyclohexyl) ethyl trimethoxy silane | Weight part | | | 0.6 | 0.4 |
| | Gamma-epoxy glycero-propyl trimethoxy silane | Weight part | 0.7 | 0.6 | | |
| | Gamma-amino propyl trimethoxy silane | Weight part | | | | |
| Titanate compound | Tri-isostearic acid isopropyl titanate | Weight part | | 0.3 | | |
| Amorphous resin | Polycarbonate (Tg = 145° C.) | Weight part | | | | |
| | Polyphenyl ether (Tg = 211° C.) | Weight part | | | | |
| | Amorphous polyarylate (Tg = 195° C.) | Weight part | | | | |
| | Polysulfone (Tg = 190° C.) | Weight part | | | | |
| | Polyether sulfone (Tg = 220° C.) | Weight part | 33.3 | | | |
| | Polyetherimide (Tg = 215° C.) | Weight part | | | 22.9 | 8.9 |
| | Polyamideimide (Tg = 250 to 300° C.) | Weight part | | | | |
| | Polyimide (Tg = 265° C.) | Weight part | 2.9 | 10 | | |
| | Polystyrene (Tg = 95° C.) | Weight part | | | | |
| Demoulding agent | Oxidized polyethylene wax | Weight part | 1 | 0.9 | 0.5 | 0.9 | 0.7 |
| Pigment | Carbon black masterbatch | Weight part | 5 | 4.3 | 0.8 | 4.3 | 3.3 |

TABLE 1-2

| Physical property | Remark | Unit | Example 1 | Example 2 | Example 3 | Example 4 | Example 5 |
|---|---|---|---|---|---|---|---|
| Chlorine content | | ppm | 871 | 892 | 871 | 897 | 986 |
| Average area of the "islands" | | μm²/piece | 0.20 | 0.07 | 0.13 | 0.28 | 0.03 |
| Melting viscosity | | Pa·s | 120 | 109 | 129 | 117 | 100 |
| Bending modulus | Rigidity | GPa | 17 | 17 | 18 | 15 | 12 |
| Charpy notched impact strength | Toughness | kJ/m² | 12 | 13 | 15 | 13 | 11 |
| Bending moment | | mm | 3.0 | 3.2 | 3.8 | 3.3 | 3.0 |

| Physical property | Remark | Unit | Example 6 | Example 7 | Example 8 | Example 9 | Comparative Example 1 |
|---|---|---|---|---|---|---|---|
| Chlorine content | | ppm | 669 | 731 | 840 | 688 | 1338 |
| Average area of the "islands" | | μm²/piece | 0.13 | 0.07 | 0.13 | 0.07 | 0.03 |
| Melting viscosity | | Pa·s | 150 | 154 | 147 | 139 | 91 |
| Bending modulus | Rigidity | GPa | 21 | 25 | 12 | 19 | 9 |
| Charpy notched impact strength | Toughness | kJ/m² | 16 | 17 | 12 | 15 | 9 |
| Bending moment | | mm | 4.5 | 2.8 | 4.0 | 4.2 | 3.8 |

TABLE 2-1

| | Component | Unit | Example 10 | Example 11 | Example 12 | Example 13 | Example 14 | Example 15 | Example 16 | Example 17 | Example 18 | Example 19 |
|---|---|---|---|---|---|---|---|---|---|---|---|---|
| PPS | PPS-3 | Weight part | | 30 | 20 | 22 | 15 | 26 | 18 | 12 | 18 | 19 |
| | PPS-4 | Weight part | | 9 | 80 | 29 | | 22 | 32 | 19 | 82 | 81 |
| | PPS-5 | Weight part | 100 | 61 | | 49 | 85 | 52 | 50 | 69 | | |
| | PPS-6 | Weight part | | | | | | | | | | |
| Elastomer | Polypropylene-g-maleic anhydride | Weight part | 2.7 | | | | | | | 2.4 | 1.8 | 1.9 |
| | Poly(isobutene-alt-maleic anhydride) | Weight part | | 1.9 | | | | | | | | 3.8 |
| | Poly(ethylene-co-glycidyl methacrylate) | Weight part | | | 2.0 | 2.2 | | | 2.2 | | 3.6 | |
| | Poly(ethylene-co-propylene) | Weight part | | | | | 1.5 | 2.2 | | | | |
| Glass fiber | Flatness ratio 4 | Weight part | 151 | 70 | 50 | 97 | 200 | | | | 50 | 50 |
| | Flatness ratio 2 | Weight part | | | | | | 106 | 97 | 115 | | |
| | Flatness ratio 1 (Circular section) | Weight part | | | | | | | | | | |
| Additive | Calcium carbonate | Weight part | 8.2 | 5.6 | 10 | 6.5 | 1.5 | 6.7 | 6.5 | 7.1 | 3.6 | 5.8 |
| Antioxidant | Pentaerythritol tetra(3-(3',5'-ditertiary butyl)-4'-hydroxyphenyl) propionate | Weight part | | | | | | | 0.9 | | | |
| Silane compound | Beta-(3,4-epoxy cyclohexyl) ethyl trimethoxy silane | Weight part | | 0.4 | | 0.4 | | | 0.4 | 0.5 | 1.8 | |
| | Gamma-epoxy glycero-propyl trimethoxy silane | Weight part | | | 0.4 | | | 0.7 | | | | |
| | Gamma-amino propyl trimethoxy silane | Weight part | | | | | 0.3 | | | | | |
| Titanate compound | Tri-isostearic acid isopropyl titanate | Weight part | 0.5 | | | | | | | | | 1.9 |
| Amorphous resin | Polycarbonate (Tg = 145° C.) | Weight part | | 4.6 | | | | | | | | |
| | Polyphenyl ether (Tg = 211° C.) | Weight part | | | 35 | | | | | | | |
| | Amorphous polyarylate (Tg = 195° C.) | Weight part | 8.2 | | | | | | | | | |
| | Polysulfone (Tg = 190° C.) | Weight part | | | | | | 1.5 | | | | 5.8 |
| | Polyether sulfone (Tg = 220° C.) | Weight part | | | | | | | 6.7 | | 8.9 | 19.2 |
| | Polyetherimide (Tg = 215° C.) | Weight part | | | | | 6.5 | | | | 5.4 | |
| | Polyamideimide (Tg = 250 to 300° C.) | Weight part | | | | | | | | 6.5 | | |
| | Polyimide (Tg = 265° C.) | Weight part | | | | | | | | 7.1 | | |
| | Polystyrene (Tg = 95° C.) | Weight part | | | | | | | | | | |
| Demoulding agent | High-melting-point amide | Weight part | 0.8 | 0.6 | 0.6 | 0.6 | 0.3 | 0.7 | 0.6 | 0.7 | 1.8 | 1.9 |
| Pigment | Carbon black masterbatch | Weight part | 5.5 | 3.7 | 4.0 | 4.3 | 0.9 | 3.4 | 4.3 | 4.7 | 3.6 | 3.8 |

| | Component | Unit | Example 20 | Example 21 | Example 22 | Example 23 | Example 24 | Example 25 | Example 26 | Example 27 | Comparative Example 2 | Comparative Example 3 |
|---|---|---|---|---|---|---|---|---|---|---|---|---|
| PPS | PPS-3 | Weight part | 25 | 22 | 26 | 18 | 22 | 22 | 22 | 22 | 25 | 12 |
| | PPS-4 | Weight part | 26 | 29 | 22 | 32 | 29 | 29 | 29 | 29 | 26 | 19 |
| | PPS-5 | Weight part | | 49 | 52 | 50 | 49 | 49 | 49 | 49 | 49 | 69 |
| | PPS-6 | Weight part | 49 | | | | | | | | | |

TABLE 2-1-continued

| | | | Example 10 | Example 11 | Example 12 | Example 13 | Example 14 | Example 15 | Example 16 | Example 17 | Example 18 | Example 19 |
|---|---|---|---|---|---|---|---|---|---|---|---|---|
| Elastomer | Polypropylene-g-maleic anhydride | Weight part | | | | | | | | | | 2.4 |
| | Poly(isobutene-alt-maleic anhydride) | Weight part | | | | | | | | | | |
| | Poly(ethylene-co-glycidyl methacrylate) | Weight part | 2.2 | 2.2 | | 2.2 | 2.2 | 2.2 | | 2.2 | 2.2 | |
| | Poly(ethylene-co-propylene) | Weight part | | | 2.2 | | | | | | | |
| Glass fiber | Flatness ratio 4 | Weight part | 97 | 97 | | | 97 | 97 | 97 | 97 | | |
| | Flatness ratio 2 | Weight part | | | 225 | 97 | | | | | | |
| | Flatness ratio 1 (Circular section) | Weight part | | | | | | | | | 97 | 115 |
| Additive | Calcium carbonate | Weight part | 6.5 | 6.5 | 6.7 | 6.5 | 6.5 | 6.5 | 6.5 | 6.5 | 65 | 7.1 |
| Antioxidant | Pentaerythritol tetra(3-(3',5'-ditertiary butyl)-4'-hydroxyphenyl) propionate | Weight part | | | 0.9 | | | | | | | |
| Silane compound | Beta-(3,4-epoxy cyclohexyl) ethyl trimethoxy silane | Weight part | 0.4 | 0.4 | | 0.4 | 0.4 | | 0.4 | 0.05 | 0.4 | 0.5 |
| | Gamma-epoxy glycero-propyl trimethoxy silane | Weight part | | | 0.7 | | | | | | | |
| | Gamma-amino propyl trimethoxy silane | Weight part | | | | | | | | | | |
| Titanate compound | Tri-isostearic acid isopropyl titanate | Weight part | | | | | | | | | | |
| Amorphous resin | Polycarbonate (Tg = 145° C.) | Weight part | | | | | | | | | | |
| | Polyphenyl ether (Tg = 211° C.) | Weight part | | | | | | | | | | |
| | Amorphous polyarylate (Tg = 195° C.) | Weight part | | | | | | | | | | |
| | Polysulfone (Tg = 190° C.) | Weight part | | | | | | | | | | |
| | Polyether sulfone (Tg = 220° C.) | Weight part | | | 6.7 | | | | | | | |
| | Polyetherimide (Tg = 215° C.) | Weight part | 6.5 | | | | | 6.5 | 6.5 | 6.5 | | |
| | Polyamideimide (Tg = 250 to 300° C.) | Weight part | | | | 0.5 | | | | | | |
| | Polyimide (Tg = 265° C.) | Weight part | | | | | | | | | | 7.1 |
| | Polystyrene (Tg = 95° C.) | Weight part | | | | | 6.5 | | | | | |
| Demoulding agent | High-melting-point amide | Weight part | 0.6 | 0.6 | 0.7 | 0.6 | 0.6 | 0.6 | 0.6 | 0.6 | 0.6 | 0.7 |
| Pigment | Carbon black masterbatch | Weight part | 4.3 | 4.3 | 3.4 | 4.3 | 4.3 | 4.3 | 4.3 | 4.3 | 4.3 | 4.7 |

TABLE 2-2

| Physical property | Remark | Unit | Example 10 | Example 11 | Example 12 | Example 13 | Example 14 | Example 15 | Example 16 | Example 17 | Example 18 | Example 19 |
|---|---|---|---|---|---|---|---|---|---|---|---|---|
| Chlorine content | | ppm | 687 | 953 | 558 | 739 | 618 | 748 | 727 | 720 | 640 | 642 |
| Recrystallization temperature | | ° C. | 214 | 195 | 155 | 206 | 218 | 209 | 202 | 215 | 175 | 160 |
| Crystallization degree | | % | 54 | 48 | 25 | 50 | 58 | 52 | 49 | 53 | 35 | 30 |
| Average area of the "islands" | | μm²/piece | 0.10 | 0.52 | 0.11 | 0.09 | 0.08 | 0.10 | 0.12 | 0.15 | 0.09 | 0.10 |
| Melting viscosity | | Pa·s | 139 | 149 | 128 | 120 | 145 | 124 | 125 | 129 | 125 | 136 |
| Bending modulus | Rigidity | GPa | 21 | 10 | 11 | 16 | 26 | 17 | 16 | 18 | 12 | 12 |
| Charpy notched impact strength | Toughness | kJ/m² | 14 | 9 | 11 | 13 | 18 | 13 | 14 | 13 | 10 | 10 |
| Bending moment | | mm | 2.9 | 2.8 | 5.2 | 3.2 | 2.6 | 3.2 | 3.3 | 3.1 | 4.2 | 4.8 |

TABLE 2-2-continued

| Physical property | Remark | Unit | Example 20 | Example 21 | Example 22 | Example 23 | Example 24 | Example 25 | Example 26 | Example 27 | Comparative Example 2 | Comparative Example 3 |
|---|---|---|---|---|---|---|---|---|---|---|---|---|
| Chlorine content | | ppm | 340 | 762 | 490 | 747 | 739 | 741 | 747 | 741 | 775 | 720 |
| Recrystallization temperature | | °C. | 210 | 228 | 230 | 225 | 220 | 225 | 210 | 225 | 250 | 245 |
| Crystallization degree | | % | 52 | 65 | 70 | 60 | 59 | 61 | 52 | 61 | 72 | 75 |
| Average area of the "islands" | | μm²/piece | 0.07 | | 0.20 | 0.03 | | 1.5 | 0.11 | 0.9 | | 0.55 |
| Melting viscosity | | Pa·s | 100 | 112 | 169 | 115 | 185 | 118 | 117 | 119 | 125 | 155 |
| Bending modulus | Rigidity | GPa | 15 | 16 | 28 | 16 | 14 | 16 | 16 | 16 | 16 | 18 |
| Charpy notched impact strength | Toughness | kJ/m² | 11 | 11 | 19 | 11 | 10 | 11 | 12 | 11 | 7 | 9 |
| Bending moment | | mm | 3.0 | 2.3 | 2.0 | 2.4 | 2.7 | 2.9 | 2.8 | 3.0 | 1.5 | 2.3 |

TABLE 3-1

| Physical property | Remark | Unit | Example 28 | Example 29 | Example 30 | Example 31 | Example 32 | Example 33 |
|---|---|---|---|---|---|---|---|---|
| Mould temperature | | °C. | 90 | 80 | 60 | 40 | 30 | 10 |
| Crystallization degree | | % | 48 | 46 | 40 | 35 | 25 | 22 |
| Bending modulus | Rigidity | GPa | 14 | 14 | 14 | 14 | 14 | 14 |
| Bending moment | | mm | 8.5 | 8.8 | 9.4 | 10.0 | 10.8 | 11.2 |

All the Patent Documents and Non-Patent Documents that are provided in the description are incorporated into this text by reference. The "multiple" in the description includes all cases that the number is larger than one, that is, "one or more" includes one, two, three, . . . , etc. In the specification, when an upper limit and a lower limit of a certain value range are respectively recorded, or the upper limit and the lower limit are combined to record the certain value range, each upper limit and each lower limit which are recorded can be randomly combined to be a new value range, and such a recording mode should be the same as a recording form of a value range which is formed by combining direct and definite records. The person skilled in the art can modify and improve the invention without departing from the theme of the invention, and these modifications and improvements shall fall within the scope of protection of the invention.

The invention claimed is:

1. A polyphenylene sulfide resin composition, comprising:
   polyphenylene sulfide resin (A),
   a deformed cross-section glass fiber (B), and
   amorphous resin (C) having a glass-transition temperature a equal to or higher than 100° C. and being selected from polycarbonate, polyphenyl ether, amorphous polyarylate, polysulfone, polyether sulfone, polyetherimide, polyimide and one or more copolymers thereof,
   wherein:
   the chlorine content of the polyphenylene sulfide resin composition is equal to or lower than 1,000 ppm, and
   the recrystallization temperature of the polyphenylene sulfide resin composition is equal to or higher than 210° C. and lower than 220° C.

2. The polyphenylene sulfide resin composition according to claim 1, wherein the recrystallization temperature of the polyphenylene sulfide resin composition is equal to or higher than 210° C. and lower than 215° C.

3. The polyphenylene sulfide resin composition according to claim 1, wherein the polyphenylene sulfide is an end-capped polyphenylene sulfide.

4. The polyphenylene sulfide resin composition according to claim 1, comprising 50 to 200 weight parts of the deformed cross-section glass fiber (B) relative to 100 weight parts of the polyphenylene sulfide resin (A).

5. The polyphenylene sulfide resin composition according to claim 1, comprising
   1.5 to 35 weight parts of the amorphous resin (C) with the glass-transition temperature being equal to or higher than 100° C. relative to 100 weight parts of the polyphenylene sulfide resin (A).

6. The polyphenylene sulfide resin composition according to claim 1, wherein the amorphous resin (C) with the glass-transition temperature being equal to or higher than 100° C. generates a dispersion of islands in the polyphenylene sulfide resin composition, and the average area of an island in a cross section is smaller than one μm².

7. The polyphenylene sulfide resin composition according to claim 1, wherein the flatness ratio of the deformed cross-section glass fiber (B) is equal to or larger than 1.5.

8. The polyphenylene sulfide resin composition according to claim 1, wherein the melting viscosity of a capillary rheometer of the polyphenylene sulfide resin composition, which has the shearing rate of 1,000 s$^{-1}$ under 315° C., is lower than 180 Pa·s.

9. The polyphenylene sulfide resin composition according to claim 1, further comprising an elastomer.

10. The polyphenylene sulfide resin composition according to claim 9, wherein the elastomer is one or more of an olefin elastomer, a modified olefin elastomer and a styrene elastomer.

11. A moulding prepared from the polyphenylene sulfide resin composition according to claim 1.

12. The moulding according to claim 11, wherein the thickness of the moulding is equal to or lower than 1.5 mm.

13. The moulding according to claim 11, wherein the crystallization degree of the moulding is smaller than 50 percent.

14. A product for forming frames of a portable computer, a mobile phone or a portable electronic device, which is prepared from the moulding according to claim 11.

15. A manufacturing process of the moulding according to claim 11, wherein the manufacturing process adopts an in-mould insert injection or in-mould transfer moulding technology, and comprises the following steps: firstly putting a cut plastic thin film into a mould, and then performing injection moulding on the polyphenylene sulfide resin composition by an injection moulding machine; the temperature of the mould is equal to or lower than the glass-transition temperature of the polyphenylene sulfide resin (A).

16. The manufacturing process of the moulding according to claim 15, wherein the temperature of the mould is 5 to 95° C.

17. The polyphenylene resin composition according to claim 1, wherein the polyphenylene sulfide resin is a polymer that comprises a repeating unit represented formula (I),

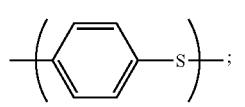

(I)

in an amount of 70 mole percent or more.

18. The polyphenylene resin composition according to claim 17, wherein the polyphenylene sulfide resin is a polymer that comprises, in addition to the repeating unit represented formula (I), one or more repeating units selected from the group comprising formulas (II), (III), (IV), (V), (VI), (VII) and (VIII) having structures listed below:

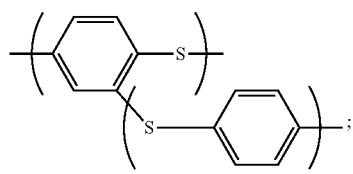

(II)

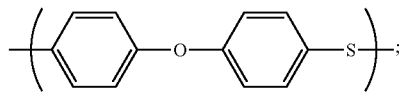

(III)

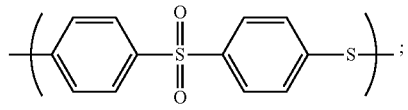

(IV)

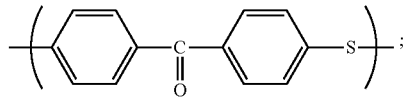

(V)

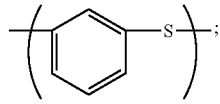

(VI)

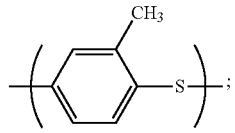

(VII)

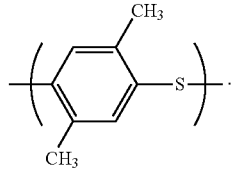

(VIII)

\* \* \* \* \*